(12) United States Patent
Schaefer

(10) Patent No.: US 10,966,170 B1
(45) Date of Patent: Mar. 30, 2021

(54) SYSTEMS AND METHODS FOR GENERATING AND QUERYING AN INDEX ASSOCIATED WITH TARGETED COMMUNICATIONS

(71) Applicant: THE TRADE DESK, INC., Ventura, CA (US)

(72) Inventor: Alexander L. Schaefer, Boulder, CO (US)

(73) Assignee: The Trade Desk, Inc., Ventura, CA (US)

( * ) Notice: Subject to any disclaimer, the term of this patent is extended or adjusted under 35 U.S.C. 154(b) by 0 days.

(21) Appl. No.: 17/010,745

(22) Filed: Sep. 2, 2020

(51) Int. Cl.
*G06F 16/901* (2019.01)
*G06F 16/9035* (2019.01)
*H04W 56/00* (2009.01)
*H04W 24/02* (2009.01)
*H04W 40/24* (2009.01)
*H04W 84/18* (2009.01)

(52) U.S. Cl.
CPC ........ *H04W 56/001* (2013.01); *G06F 16/901* (2019.01); *G06F 16/9035* (2019.01); *H04W 24/02* (2013.01); *H04W 40/244* (2013.01); *H04W 40/246* (2013.01); *H04W 84/18* (2013.01)

(58) Field of Classification Search
CPC . H04W 56/001; H04W 24/02; H04W 40/244; H04W 40/246; H04W 84/18; G06F 16/901; G06F 16/9035
See application file for complete search history.

(56) References Cited

U.S. PATENT DOCUMENTS

| | | | | |
|---|---|---|---|---|
| 2014/0214709 | A1* | 7/2014 | Greaney | G06Q 10/1053 705/321 |
| 2017/0365023 | A1* | 12/2017 | Cox | G06Q 50/20 |
| 2018/0005081 | A1* | 1/2018 | Wnuk | G06K 9/6232 |
| 2019/0034801 | A1* | 1/2019 | Sodhani | G06N 3/088 |
| 2019/0259473 | A1* | 8/2019 | Och | G16B 20/20 |
| 2019/0362184 | A1* | 11/2019 | Wnuk | G06K 9/4633 |
| 2020/0342342 | A1* | 10/2020 | Hachiya | G16B 20/00 |

* cited by examiner

*Primary Examiner* — Brian D Nguyen
(74) *Attorney, Agent, or Firm* — Baker & McKenzie LLP

(57) ABSTRACT

This disclosure is directed to systems and methods for generating and querying an index associated with targeted communications. A method may include receiving candidate identifiers, rates of targeted communication, and traits associated with the candidate identifiers. A method may include generating a candidate index including one or more dimensions associated with candidate traits. A method may include receiving a query associated with desired candidate traits, determining if one or more candidates appear in the dimensions associated with the desired traits, and intersecting the dimensions to determine if one or more candidates appear in all of the dimensions associated with the desired candidate traits. A method may include generating a result set based on the results of an intersecting computation. A method may include removing candidates from the result set and transmitting targeted communications on behalf of or to the candidates remaining on the result set.

30 Claims, 4 Drawing Sheets

SYSTEMS AND METHODS FOR GENERATING AND QUERYING AN INDEX ASSOCIATED WITH TARGETED COMMUNICATIONS

TECHNICAL FIELD

The present disclosure relates, according to some embodiments, to targeted communications and, more specifically, to providing users with targeted communications using intersecting, multi-dimensional inverted indexes.

BACKGROUND

Targeted communications are accomplished by locating an appropriate audience and ensuring that the targeted communication effectively reaches them so that sales would be increased and wasteful efforts would be reduced. A more cost effective way of generating and transmitting targeted communications than the existing approaches is desired.

SUMMARY

According to some embodiments, a method for generating and querying an index associated with targeted communications may comprise: determining or receiving, using one or more computing device processors, a first candidate identifier, a first rate of targeted communication transmission, and at least one trait associated with a targeted communication recipient, associated with a first candidate targeted communication; determining or receiving, using the one or more computing device processors, a second candidate identifier, a second rate of targeted communication transmission, and at least one trait associated with a targeted communication recipient, associated with a second candidate targeted communication; determining or receiving, using the one or more computing device processors, a third candidate identifier, a third rate of targeted communication transmission, and at least one trait associated with a targeted communication recipient, associated with a third candidate targeted communication; generating or accessing, using the one or more computing device processors, a candidate index comprising: a first dimension, comprising a first dimension trait associated with the first candidate targeted communication, a first dimension trait associated with the second candidate targeted communication, and a first dimension trait associated with the third candidate targeted communication; and a second dimension comprising a second dimension trait associated with the first candidate targeted communication and a second dimension trait associated with the third candidate targeted communication, wherein the second candidate targeted communication does not comprise a second dimension trait associated with the second candidate targeted communication; receiving, using the one or more computing device processors, a query from a computing device, wherein the query is associated with a first desired candidate trait, associated with the first dimension, and a second desired candidate trait, associated with the second dimension; determining or generating, using the one or more computing device processors, an ordered first set comprising a first indicator indicating whether the first candidate targeted communication comprises the first desired candidate trait, a second indicator indicating whether the second candidate targeted communication comprises the first desired candidate trait, and a third indicator indicating whether the third candidate targeted communication comprises the first desired candidate trait, wherein a position of the first indicator in the ordered first set corresponds to a position of the first candidate targeted communication in the candidate index, wherein a position of the second indicator in the ordered first set corresponds to a position of the second candidate targeted communication in the candidate index, and wherein a position of the third indicator in the ordered first set corresponds to a position of the third candidate targeted communication in the candidate index; determining or generating, using the one or more computing device processors, an ordered second set comprising a fourth indicator indicating whether the first candidate targeted communication comprises the second desired candidate trait, a fifth indicator indicating whether the second candidate targeted communication comprises the second desired candidate trait, and a sixth indicator indicating whether the third candidate targeted communication comprises the second desired candidate trait; determining or generating, using the one or more computing device processors, based on performing an intersecting computation based on the ordered first set and the ordered second set, a result set comprising a seventh indicator associated with the first candidate targeted communication and an eighth indicator associated with the third candidate targeted communication; eliminating, using the one or more computing device processors, the first candidate targeted communication from the result set based on the first rate of targeted communication transmission; and selecting, using the one or more computing device processors, the third candidate targeted communication from the result set based on the third rate of targeted communication transmission.

According to some embodiments, a position of the fourth indicator in the ordered second set corresponds to the position of the first candidate targeted communication in the candidate index, wherein a position of the fifth indicator in the ordered second set corresponds to the position of the second candidate targeted communication in the candidate index, and wherein a position of the sixth indicator in the ordered second set corresponds to the position of the third candidate targeted communication in the candidate index.

According to some embodiments, the method further comprises transmitting, using the one or more computing device processors, the third candidate targeted communication to a user device for display on the user device.

According to some embodiments, in response to determining the second candidate targeted communication does not comprise the second dimension trait, the second candidate targeted communication is included in an always-matching set for the second dimension such that one or more candidate targeted communications from the always-matching set are always included in the ordered second set.

According to some embodiments, in response to determining the second candidate targeted communication does not comprise the second dimension trait, the fifth indicator indicates the second candidate targeted communication comprises all second dimension traits.

According to some embodiments, the ordered first set comprises non-binary indicators.

According to some embodiments, the candidate index comprises a candidate array.

According to some embodiments, the ordered first set comprises binary indicators.

According to some embodiments, another method is provided for generating and querying an index associated with targeted communications. The method comprises: determining or receiving, using one or more computing device processors, a first candidate identifier and at least one trait associated with a targeted communication recipient, associated with a first candidate targeted communication; determining or receiving, using the one or more computing device processors, a second candidate identifier and at least one trait associated with a targeted communication recipient, associated with a second candidate targeted communication; determining or receiving, using the one or more computing device processors, a third candidate identifier and at least one trait associated with a targeted communication recipient, associated with a third candidate targeted communication; generating or accessing, using the one or more computing device processors, a candidate index comprising: a first dimension, comprising a first dimension trait associated with the first candidate targeted communication, a first dimension trait associated with the second candidate targeted communication, and a first dimension trait associated with the third candidate targeted communication; and a second dimension comprising a second dimension trait associated with the first candidate targeted communication and a second dimension trait associated with the third candidate targeted communication, wherein the second candidate targeted communication does not comprise a second dimension trait associated with the second candidate targeted communication; receiving, using the one or more computing device processors, a query from a computing device, wherein the query is associated with a first desired candidate trait, associated with the first dimension, and a second desired candidate trait, associated with the second dimension; determining or generating, using the one or more computing device processors, an ordered first set comprising a first indicator indicating whether the first candidate targeted communication comprises the first desired candidate trait, a second indicator indicating whether the second candidate targeted communication comprises the first desired candidate trait, and a third indicator indicating whether the third candidate targeted communication comprises the first desired candidate trait, wherein a position of the first indicator in the ordered first set corresponds to a position of the first candidate targeted communication in the candidate index, wherein a position of the second indicator in the ordered first set corresponds to a position of the second candidate targeted communication in the candidate index, and wherein a position of the third indicator in the ordered first set corresponds to a position of the third candidate targeted communication in the candidate index; determining or generating, using the one or more computing device processors, an ordered second set comprising a fourth indicator indicating whether the first candidate targeted communication comprises the second desired candidate trait, a fifth indicator indicating whether the second candidate targeted communication comprises the second desired candidate trait, and a sixth indicator indicating whether the third candidate targeted communication comprises the second desired candidate trait; determining or generating, using the one or more computing device processors, based on performing a computation based on the ordered first set and the ordered second set, a result set comprising a seventh indicator associated with the first candidate targeted communication and an eighth indicator associated with the third candidate targeted communication; and selecting, using the one or more computing device processors, the third candidate targeted communication from the result set based on the third rate of targeted communication transmission.

According to some embodiments, a position of the fourth indicator in the ordered second set corresponds to the position of the first candidate targeted communication in the candidate index, wherein a position of the fifth indicator in the ordered second set corresponds to the position of the second candidate targeted communication in the candidate index, and wherein a position of the sixth indicator in the ordered second set corresponds to the position of the third candidate targeted communication in the candidate index.

According to some embodiments, the method further comprises transmitting, using the one or more computing device processors, the third candidate targeted communication to a user device for display on the user device.

According to some embodiments, in response to determining the second candidate targeted communication does not comprise the second dimension trait, the second candidate targeted communication is included in an always-matching set for the second dimension such that one or more candidate targeted communications from the always-matching set are always included in the ordered second set.

According to some embodiments, in response to determining the second candidate targeted communication does not comprise the second dimension trait, the fifth indicator indicates the second candidate targeted communication comprises multiple second dimension traits.

According to some embodiments, the first dimension further comprises the first candidate identifier.

According to some embodiments, the ordered first set is associated with the first dimension and comprises non-binary indicators.

According to some embodiments, the ordered first set is associated with the first dimension and comprises binary indicators.

According to some embodiments, the method further comprises determining or receiving, using the one or more computing device processors, a first rate of targeted communication transmission associated with the first candidate identifier.

According to some embodiments, the method further comprises generating, using the one or more computing device processors, a first rate tag based on the first rate of targeted communication transmission associated with the first candidate identifier.

According to some embodiments, the method further comprises eliminating, using the one or more computing device processors, the first candidate targeted communication from the result set based on the first rate tag.

According to some embodiments, a system is provided for generating and querying an index associated with targeted communications. The system comprises: a memory comprising instructions; and a processing device configured for executing the server instructions, wherein the instructions cause the processing device to perform operations of: determining or receiving a first candidate identifier, a first rate of targeted communication transmission, and at least one trait associated with a targeted communication recipient, associated with a first candidate targeted communication; determining or receiving a second candidate identifier, a second rate of targeted communication transmission, and at least one trait associated with a targeted communication recipient, associated with a second candidate targeted communication; determining or receiving a third candidate identifier, a third rate of targeted communication transmission, and at least one trait associated with a targeted communication recipient, associated with a third candidate targeted communication; generating or accessing a candidate index comprising: a first dimension, comprising a first dimension trait associated with the first candidate targeted communication, a first dimension trait associated with the second candidate targeted communication, and a first dimension trait associated with the third candidate targeted communication; and a second dimension comprising a second dimension trait associated with the first candidate targeted communication and a second dimension trait associated with the third candidate targeted communication, wherein the second candidate targeted communication does not comprise a second dimension trait associated with the second candidate targeted communication; receiving a query from a computing device, wherein the query is associated with a first desired candidate trait, associated with the first dimension, and a second desired candidate trait, associated with the second dimension; determining or generating an ordered first set comprising a first indicator indicating whether the first candidate targeted communication comprises the first desired candidate trait, a second indicator indicating whether the second candidate targeted communication comprises the first desired candidate trait, and a third indicator indicating whether the third candidate targeted communication comprises the first desired candidate trait, wherein a position of the first indicator in the ordered first set corresponds to a position of the first candidate targeted communication in the candidate index, wherein a position of the second indicator in the ordered first set corresponds to a position of the second candidate targeted communication in the candidate index, and wherein a position of the third indicator in the ordered first set corresponds to a position of the third candidate targeted communication in the candidate index; determining or generating an ordered second set comprising a fourth indicator indicating whether the first candidate targeted communication comprises the second desired candidate trait, a fifth indicator indicating whether the second candidate targeted communication comprises the second desired candidate trait, and a sixth indicator indicating whether the third candidate targeted communication comprises the second desired candidate trait; determining or generating, based on performing an intersecting computation based on the ordered first set and the ordered second set, a result set comprising a seventh indicator associated with the first candidate targeted communication and an eighth indicator associated with the third candidate targeted communication; eliminating the first candidate targeted communication from the result set based on the first rate of targeted communication transmission; and selecting the third candidate targeted communication from the result set based on the third rate of targeted communication transmission.

According to some embodiments, another method provided for generating and querying an index associated with targeted communications may comprise: determining or receiving, using one or more computing device processors, a first candidate identifier, a first rate of targeted communication transmission, and at least one trait associated with a targeted communication recipient, associated with a first candidate targeted communication; determining or receiving, using the one or more computing device processors, a second candidate identifier, a second rate of targeted communication transmission, and at least one trait associated with a targeted communication recipient, associated with a second candidate targeted communication; determining or receiving, using the one or more computing device processors, a third candidate identifier, a third rate of targeted communication transmission, and at least one trait associated with a targeted communication recipient, associated with a third candidate targeted communication; accessing, using the one or more computing device processors, a candidate index comprising: a first dimension, comprising a first dimension trait associated with the first candidate targeted communication, and a first dimension trait associated with the second candidate targeted communication, wherein the third candidate targeted communication does not comprise a first dimension trait associated with the third candidate targeted communication; and a second dimension comprising a second dimension trait associated with the first candidate targeted communication and a second dimension trait associated with the third candidate targeted communication, wherein the second candidate targeted communication does not comprise a second dimension trait associated with the second candidate targeted communication; receiving, using the one or more computing device processors, a query from a computing device, wherein the query is associated with a first desired candidate trait, associated with the first dimension, and a second desired candidate trait, associated with the second dimension; determining or generating, using the one or more computing device processors, a first set comprising the first candidate targeted communication, in response to determining the first candidate targeted communication comprises or is associated with the first desired candidate trait, the second candidate targeted communication, in response to determining the second candidate targeted communication comprises or is associated with the first desired candidate trait, wherein the third candidate targeted communication is not included in the first set, in response to determining the third candidate targeted communication does not comprise or is not associated with the first desired candidate trait; determining or generating, using the one or more computing device processors, a second set comprising the first candidate targeted communication, in response to determining the first candidate targeted communication comprises or is associated with the second desired candidate trait, and the third candidate targeted communication, in response to determining the third candidate targeted communication comprises or is associated with the second desired candidate trait, wherein the second candidate targeted communication is not included in the second set, in response to determining the second candidate targeted communication does not comprise or is not associated with the second desired candidate trait; determining, using the one or more computing device processors, the first candidate targeted communication is a common candidate targeted communication between the first set and the second set; and determining, using the one or more computing device processors, whether to send the first candidate targeted communication to a user device based on the first rate of targeted communication transmission.

According to some embodiments, the first set is ordered.

According to some embodiments, a position of the first indicator in the first set corresponds to a position of the first candidate targeted communication in the candidate index, and wherein a position of the second indicator in the ordered first set corresponds to a position of the second candidate targeted communication in the candidate index.

According to some embodiments, the second set is ordered.

According to some embodiments, the first set, the second set, or a result set produced from performing an intersecting computing based on the first set and the second set, does not comprise an always-matching candidate targeted communication that comprises or is associated with the first desired candidate trait and the second desired candidate trait.

According to some embodiments, the always-matching candidate is comprised in an always-matching set.

According to some embodiments, the first set, the second set, or a result set produced from performing an intersecting computing based on the first set and the second set, comprises an always-matching candidate targeted communication that comprises or is associated with the first desired candidate trait and the second desired candidate trait.

According to some embodiments, the ordered first set, the ordered second set, or the result set does not comprise an always-matching candidate targeted communication that comprises or is associated with the first desired candidate trait and the second desired candidate trait.

According to some embodiments, the always-matching candidate targeted communication, or a ninth indicator indicating the always-matching candidate targeted communication comprises or is associated with the first desired candidate trait and the second desired candidate trait, is comprised in an always-matching set.

According to some embodiments, no or null data is present in a position in the ordered first set, the ordered second set, or the result set corresponding to the always-matching candidate targeted communication.

According to some embodiments, the ordered first set, the ordered second set, or the result set comprises a ninth indicator indicating an always-matching candidate targeted communication comprises or is associated with the first desired candidate trait and the second desired candidate trait.

BRIEF DESCRIPTION OF THE DRAWINGS

Although similar reference numbers may be used to refer to similar elements for convenience, it can be appreciated that each of the various example embodiments may be considered to be distinct variations.

The present embodiments will now be described hereinafter with reference to the accompanying drawings, which form a part hereof, and which illustrate example embodiments which may be practiced. As used in the disclosures and the appended claims, the terms "embodiment" and "example embodiment" do not necessarily refer to a single embodiment, although it may, and various example embodiments may be readily combined and interchanged, without departing from the scope or spirit of the present embodiments. Furthermore, the terminology as used herein is for the purpose of describing example embodiments only, and are not intended to be limitations. In this respect, as used herein, the term "in" may include "in" and "on," and the terms "a," "an" and "the" may include singular and plural references. Furthermore, as used herein, the term "by" may also mean "from," depending on the context. Furthermore, as used herein, the term "if" may also mean "when" or "upon," depending on the context. Furthermore, as used herein, the words "and/or" may refer to and encompass any and all possible combinations of one or more of the associated listed items.

DETAILED DESCRIPTION

Targeted communications provide businesses and organizations with the ability to more effectively and efficiently communicate to the potential audience. However, the computing resources and network bandwidth required for generating and transmitting targeted communications are still pretty costly with existing technologies in the field of targeted communications. In the following detailed description, examples of an improved approach of generating and transmitting targeted communications are provided.

Figure 1:
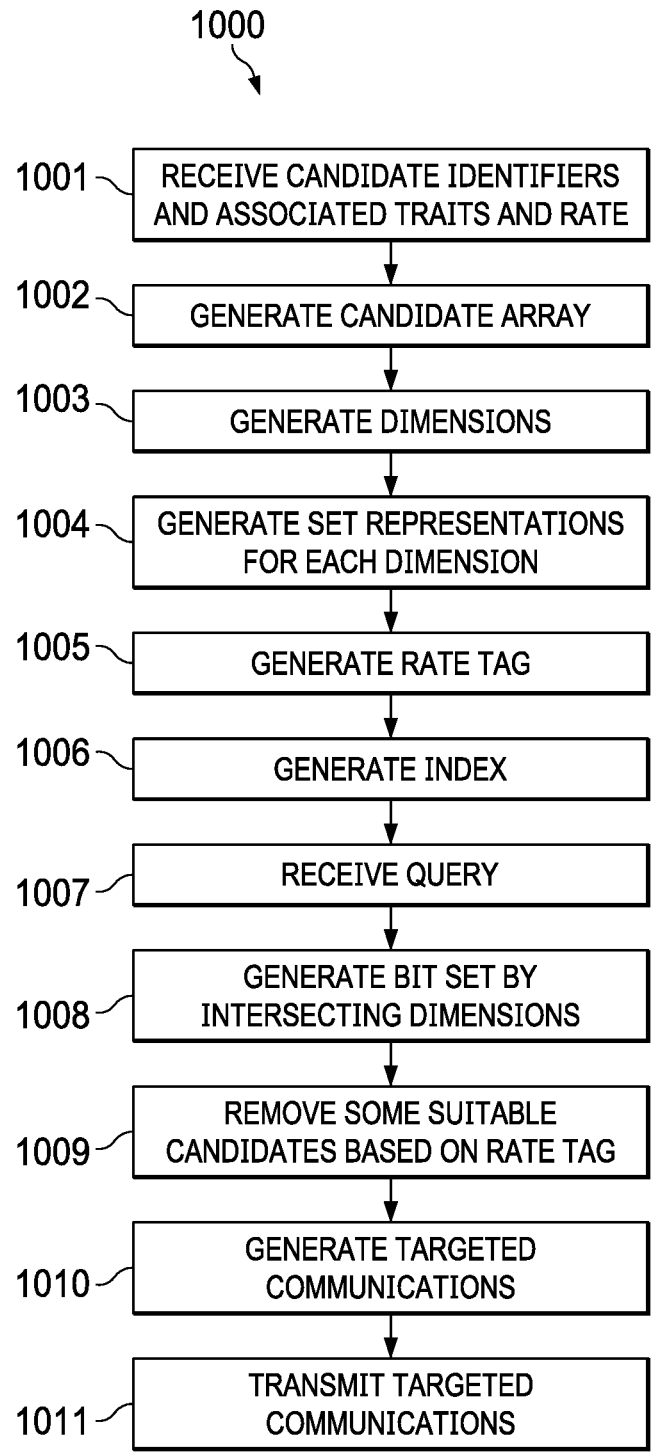
FIG. 1 shows a flowchart diagram that schematically represents a method for generating and querying an index associated with targeted communications according to disclosed embodiments.

As shown in FIG. 1, a method for generating and querying an index associated with targeted communications 1000 (e.g., by using intersecting, multi-dimensional inverted indexes) may comprise receiving, at one or more servers, at least one trait and a rate associated with a candidate identifier from one or more first computing devices 1001; generating a candidate array comprising candidate identifiers 1002; generating two or more dimensions, each dimension being associated with one of the at least one traits and comprising at least some of the candidate identifiers 1003; generating a set representation for each dimension 1004; generating a rate tag based on the rate associated with the candidate identifier 1005; generating an index by tagging one or more candidate identifiers with the corresponding rate tag 1006; receiving a query 1007; generating a bit set comprising suitable candidates by intersecting dimensions 1008; removing one or more suitable candidates based on the corresponding rate tag to generate a set of remaining candidates 1009; generating targeted communications 1010; and transmitting the targeted communications to one or more second computing devices 1011.

Figure 2:
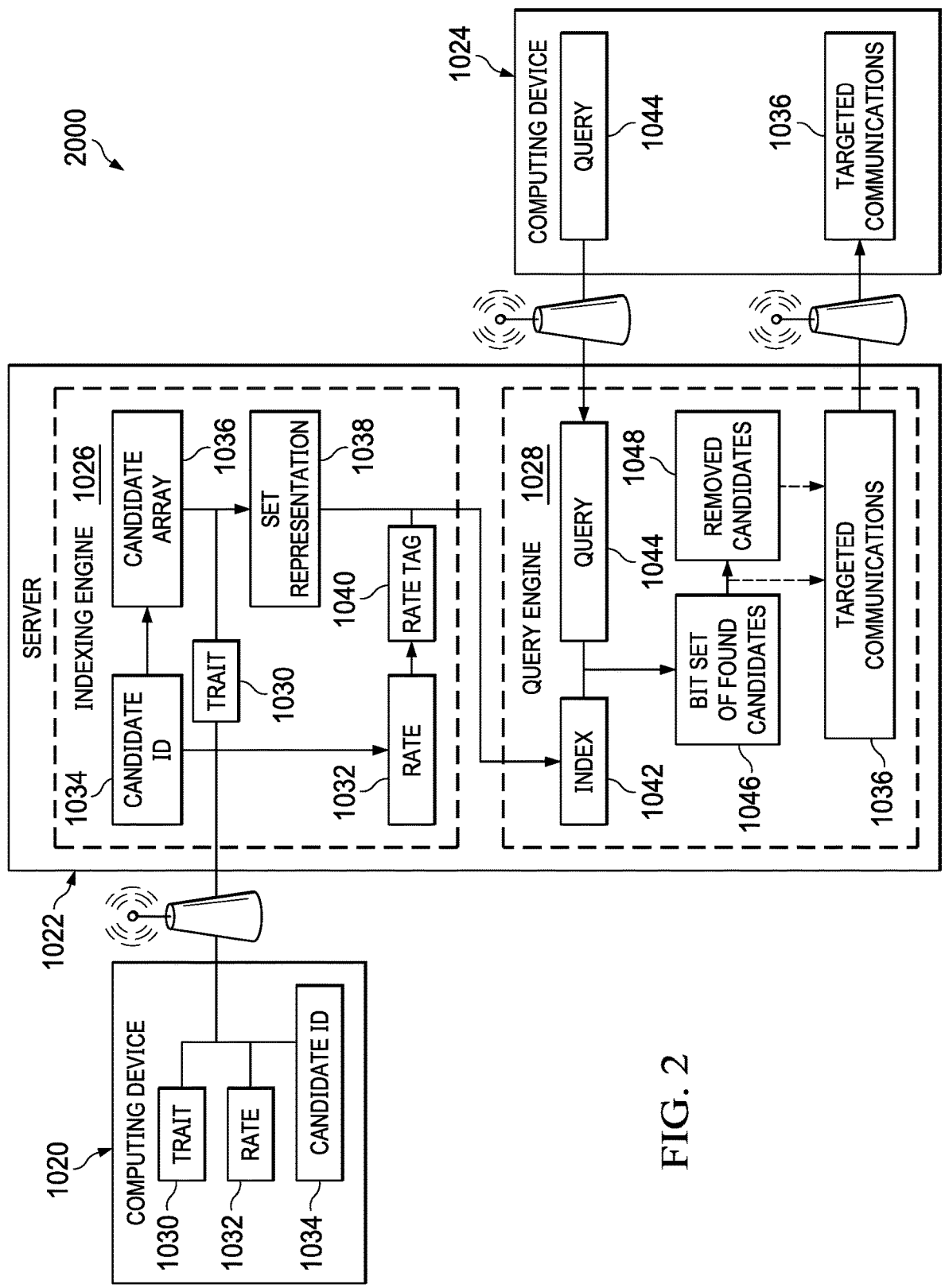
FIG. 2 shows a schematic block of a system for generating targeted communications in accordance with disclosed embodiments.

Referring now to FIG. 2, a system for generating targeted communications using intersecting, multi-dimensional inverted indexes 2000 may comprise one or more first computing devices 1020, one or more servers 1022, and one or more second computing devices 1024. The one or more servers may comprise an indexing engine 1026 and a query engine 1028. The one or more servers may, according to some embodiments, receive at least one trait 1030 and a rate 1032 associated with a candidate identifier 1034 from one or more first computing devices 1020. In some embodiments, the at least one trait 1030 and the rate 1032 associated with a candidate identifier 1034 may be received at an indexing engine 1026. A candidate identifier 1034 may be any identifier (e.g., alphanumeric and/or symbolic) which may be used to identify a candidate.

A trait 1030 may comprise information about a candidate associated with a candidate identifier 1034. For example, in some embodiments, a candidate may be a client who wishes to have targeted communications generated on their behalf. In this example, the candidate may have the candidate identifier 'abc123' and may wish to have targeted communications generated and transmitted to women, aged 40-45, who live in Longmont, Colo. In this example, traits associated with the candidate identifier 'abc123' may be, without limitation, 'Sex=Female,' 'Age=40-45 years,' and 'Geographical Location=Longmont, Colo.' Traits 1030 may be any characteristic or group of characteristics which may describe targets to which a targeted communication on behalf of a candidate may be directed. For clarity, the above examples are meant to be illustrative only and are not meant to be limiting.

A rate 1032 may comprise the rate at which a candidate wishes to have targeted communications generated on its behalf. In some embodiments, a rate 1032 may comprise a number of targeted communications per unit time. For example, a rate 1032 may be a total number of targeted communications generated on behalf of a candidate per minute, per hour, per day, per week, etc. In some embodiments, a rate 1032 may comprise a number of targeted communications generated on behalf of a candidate per total number of targeted communications generated for all (or a plurality of) candidates. For example, a rate 1032 may be 0.5%, 1.0%, 5.0%, 10.0%, etc. of all (or a plurality of) targeted communications generated by the system. In some embodiments, targeted communications may initiate allocation of an allocatable resource ("an allocatable") in an allocatable pool. In these embodiments, a rate 1032 may comprise the rate at which a candidate wishes to have an allocatable allocated from the total available allocatable pool by a targeted communication.

One or more servers 1022 may generate a candidate array 1036 comprising candidate identifiers 1034. In some embodiments, a candidate array 1036 may be generated by an indexing engine 1026 comprised in the one or more servers 1022. A candidate array 1036 may, according to some embodiments, be a bit set or a standard array. For example, a candidate array 1036 may comprise candidate identifiers 1034 as described above (e.g., 'abc123'), arranged into an array with an assigned position (e.g., 'abc123'=2, where the candidate identifier is in the second position of the array). In some embodiments, all (or a plurality of) candidate identifiers 1034 for all (or a plurality of) potential candidates are present in a candidate array 1036. In other embodiments, only a subset of candidate identifiers 1034 for potential candidates are present in a candidate array 1036.

Two or more dimensions may be generated by one or more servers 1022. In some embodiments, the two or more dimensions may be generated by an indexing engine 1026 comprised in the one or more servers. Each dimension may be associated with one of the at least one traits 1030 and may comprise at least some of the candidate identifiers 1034. For example, in some embodiments, a dimension may be associated with a particular trait 1030, such as 'Age.' In some embodiments, a dimension may be associated with multiple traits 1030, such as 'Sex' and 'Age.' In some embodiments, multiple traits 1030 (e.g., 'Age' and 'Sex') may be considered a single trait for purposes of establishing a dimension. In these examples, because the candidate identifier 'abc123' is associated with each of the traits 'Age' and 'Sex', the candidate identifier 'abc123' would be present in the dimension or dimensions associated with those traits. In the same example, where a hypothetical candidate with the candidate identifier 'def456' is associated with the trait 'Sex=Male,' but not associated with a specified age group, the candidate identifier 'def456' would appear in a dimension 'Sex', but would not appear in a dimension 'Age.'

In some embodiments, a candidate identifier 1034 may be associated with all traits associated with a dimension. For example, a candidate identifier 'abc123' may be associated with all traits associated with a dimension 'Age' (e.g., associated with all ages and/or age groups). In these embodiments, a candidate identifier 1034 may be present in a dimension as either multiple entries in the dimension (e.g., present for traits 'Age=20-25', 'Age=26-30', 'Age=31-35', etc.) or may be present in the dimension as an "always matching set." In some embodiments, an "always matching set" may comprise candidate identifiers 1034 that produce an indicator every time the dimension is queried.

A set representation 1038 may be generated for each dimension. In some embodiments, a set representation 1038 may be generated by one or more servers 1022 or by an indexing engine 1026 comprised in one or more servers 1022. A set representation 1038 may be based, at least in part, on the presence or absence of a candidate (or candidate identifier 1034) in a dimension. In some embodiments, a set representation 1038 may comprise a list of candidate array positions which appear in the dimension. For example, where candidates (or candidate identifiers 1034) corresponding to positions 0, 2, 4, and 7 of the candidate array 1036 are present in a dimension, the set representation 1038 of that dimension may appear as '0247.' In some embodiments, a set representation 1038 may comprise a binary representation of candidate array positions which appear in the dimension, where the numeral one represents a present candidate and a numeral zero represents an absent candidate. For example, where candidates (or candidate identifiers 1034) corresponding to positions 0, 2, 4, and 7 of the candidate array 1036 are present in a dimension, the set representation 1038 of that dimension may appear as '10101001.' The above examples are meant to be illustrative and not limiting. For purposes of clarity, a set representation 1038 may take any alphanumeric form that is convenient to represent candidates (or candidate identifiers 1034) which are present in or absent in a dimension.

A set representation may include one or more representation styles. For example, in an exemplary embodiment, a dimension may include a set of candidates targeting different geographical locations as shown below.

| Candidate | North America | South America | Africa | Europe | Asia | Antarctica | Australia |
|---|---|---|---|---|---|---|---|
| 0 | X | X | X | X | | | |
| 1 | | | X | X | X | X | X |
| 2 | X | X | X | X | X | X | X |
| 3 | | | X | | | | X |
| 4 | | | X | X | | | |

A set representation (e.g. ordered set, unordered, set, etc.) generated using the dimension above may, according to some embodiments, (1) include each candidate that meets the desired trait; and/or (2) include indications that a candidate does or does not match the desired trait (e.g., using a binary representations, etc.). For example, the above dimension may be represented in a set representation in one of the following ways illustrated below. In some embodiments, an always-matching candidate (or an indicator associated with whether the always-matching candidate meets a desired trait) may be included in an always-matching set. In some embodiments, an always-matching candidate (or an indicator associated with whether the always-matching candidate meets a desired trait) may be included in the set representation.

| Desired traits (lookup) | Candidates in Set Representation (result) | Representation style ((1) or (2) from above) |
|---|---|---|
| North America | 0 | (1) Set includes candidates that match |
| South America | 0 | (1) Set includes candidates that match |
| Africa | [1, 1, —, 1, 1] | (2) Set includes all candidates, with match indicated by 1, miss indicated by 0 |
| Europe | [1, 1, —, 0, 1] | (2) Set includes all candidates, with match indicated by 1, miss indicated by 0 |
| Asia | 1, 2 | (1) Set includes candidates that match |
| Antarctica | 1 | (1) Set includes candidates that match |
| Australia | [0, 1, —, 1, 0] | (2) Set includes all candidates, with match indicated by 1, miss indicated by 0 |
| Always Matching | 2 | (1) Set includes candidates that match |

A rate tag 1040 may be generated by one or more servers 1022. In some embodiments, a rate tag 1040 may be generated by an indexing engine 1026 comprised in one or more servers 1022. A rate tag 1040 may be based on a rate 1032 associated with a candidate identifier 1034 and may comprise a slot number and a total number of slots in a level. In some embodiments, one or more servers 1022 (or an indexing engine 1026 comprised therein) may assign a candidate to a level based on the rate 1032 associated with the candidate's candidate identifier 1034. For example, a candidate with a rate=0.75 may be assigned to a level=high, while a candidate with a rate=0.01 may be assigned to a level=low. A number of slots comprised in level may, according to some embodiments, be based on the rates associated with the candidates comprised in that level. For example, a candidate with a higher rate 1032 (e.g., rate=0.75) may be assigned to a level=high, which may comprise fewer slots than a lower level (e.g., level=low) comprised of candidates with lower rates 1032 (e.g., rate=0.01). A rate tag 1032 may be added to a candidate identifier 1034 (or the equivalent of, e.g. set representation) in a dimension. Collectively, dimensions are comprised in an index 1042. In some embodiments, an index 1042 may comprise all (or a plurality of) dimensions generated for all (or a plurality of) candidates. In other embodiments, an index 1042 may comprise at least some of the dimensions generated for candidates. An index 1042 may be stored, for example, in one or more databases (or a memory unit) associated with the one or more servers 1022.

Figure 4:
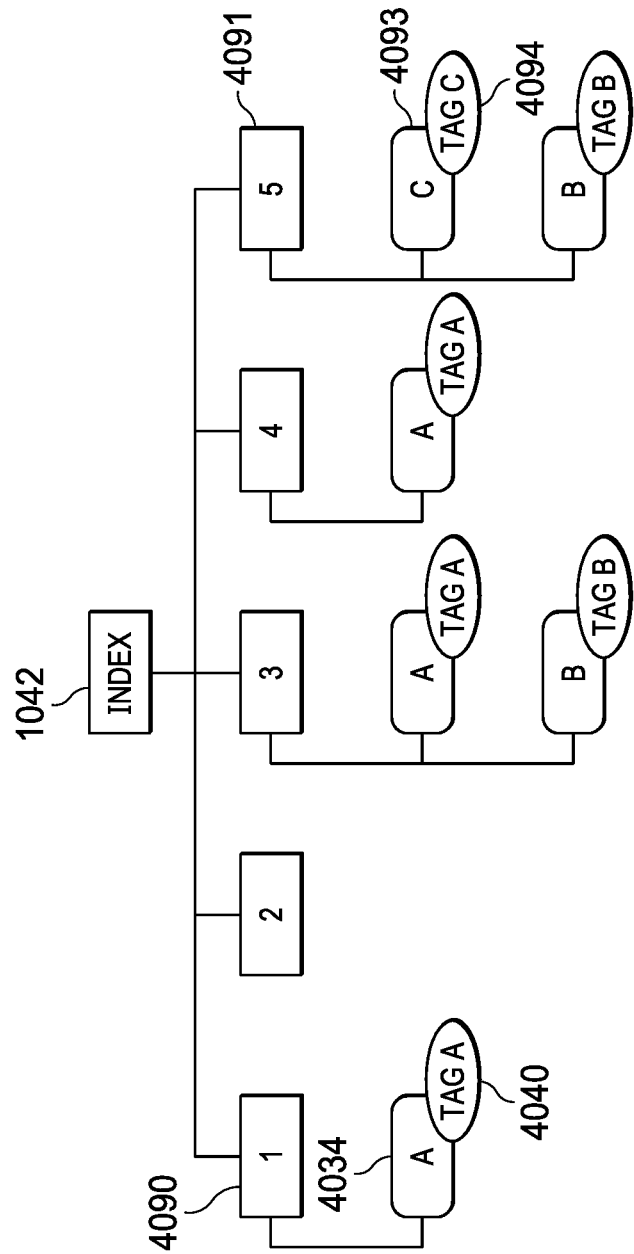
FIG. 4 shows a block diagram of an index, according to some embodiments.

Referring now to FIG. 4, an index 1042 (e.g., candidate index) may be comprised of one or more dimensions (e.g. a first dimension 4090, a second dimension 4091, etc.), according to some embodiments. One or more dimensions (e.g. a first dimension 4090, a second dimension 4091, etc.) may be associated with a trait or combination of traits. One or more dimensions (e.g. a first dimension 4090, a second dimension 4091, etc.) may comprise one or more candidate IDs (e.g., a first candidate ID 4034, a second candidate ID 4093, etc.) and/or, according to some embodiments, a rate tag (e.g., a first rate tag 4040, a second rate tag 4094, etc.). Each of a candidate ID (e.g., a first candidate ID 4034, a second candidate ID 4093, etc.) and a rate tag (e.g., a first rate tag 4040, a second rate tag 4094, etc.) may be based, at least in part, on information received from a computing device such as a first computing device and/or a second computing device. In some embodiments, a rate tag (e.g., a first rate tag 4040, a second rate tag 4094, etc.) may be based on a rate.

One or more servers 1022 may receive a query 1044 which may originate at one or more second computing devices 1024. In some embodiments, a query 1044 may be received at a query engine 1028 comprised in the one or more servers 1022. A query 1024 may comprise a request for information. For example, in some embodiments, a query 1024 may comprise a request for one or more targeted communications 1036. A query 1024 may comprise or be associated with one or more desired traits (e.g., first desired candidate trait, second desired candidate trait) of available recipients of a targeted communication, which may be associated with one or more dimensions. For example, a query 1024 may request targeted communications directed to women, aged 40-50, in Longmont, Colo. (e.g., 'Sex=Female' 'Age=40-50 years,' and 'Geographical Location=Longmont, Colorado').

In response to a query 1024, one or more servers 1022 of the system 2000 may generate a bit set 1046 comprising suitable candidates by intersecting dimensions. In some embodiments, a bit set 1046 may be generated by a query engine 1028 comprised in the one or more servers 1022. A bit set 1046 may be generated by intersecting one or more dimensions. Continuing with the above example, in response to a query 1024 requesting targeted communications directed to women, aged 40-50, in Longmont, Colo. (e.g., 'Sex=Female' 'Age=40-50 years,' and 'Geographical Location=Longmont, Colorado'), one or more servers 1022 (or a query engine 1028 comprised in the one or more servers 1022) may query the index 1042 for dimensions associated with the traits 'Sex=Female' 'Age=40-50 years,' and 'Geographical Location=Longmont, Colo.' Intersecting the dimensions provides for rapid identification of all (or a plurality of) candidates which are associated with all (or a plurality of) queried traits. In the above example, the candidate associated with the candidate identifier 'abc123' would be a suitable candidate and would be comprised in the bit set 1046. In some embodiments, targeted communications 1036 may be generated based on the bit set 1046. For example, targeted communications 1036 may be generated for all (or a plurality of) candidates in the bit set 1046 after intersection of the dimensions.

In some embodiments, one or more servers may determine or generate, in response to a query 1024, an ordered set (e.g., first ordered set, second ordered set, etc.) which may include an indicator (e.g., first indicator, second indicator, etc.) which may indicate whether or not a candidate or candidate targeted communication includes a desired candidate trait. An indicator's position in an ordered set may, according to some embodiments, correspond to a candidate's position (e.g., a position associated with a candidate identifier) in an index 1042. One or more servers may determine or generate a bit set 1046 (e.g., a result set) based on performing a computation. In some embodiments, a computation may include an intersecting computation. A computation may be performed on one or more ordered sets (e.g., first ordered set, second ordered set, etc.). In some embodiments, a bit set 1043 (e.g., result set) may include an indicator associated with a candidate or a candidate targeted communication.

One or more suitable candidates comprised in a bit set 1046 (e.g., a result set) may be removed by one or more servers (or a query engine 1028 comprised in the one or more servers 1022) based on the corresponding rate 1032 and/or rate tag 1040. In some embodiments, a bit set 1046 may comprise many suitable candidates. Removal of some (e.g., one or more) suitable candidates from a bit set 1046 may lessen strain on computing resources by prioritizing candidates with high rates 1032 (and the rate tags 1040 associated with a high rate 1032) over those with a lower rate 1032. As noted above, a rate tag 1040 may comprise both a level and a slot number and, in some embodiments, removal of suitable candidates may be achieved using slot numbers comprised in the rate tags 1040. For example, if: (1) the candidate identifier 'abc123' has a rate tag 1032 comprising a level=high and a slot number=4, and (2) candidates with level=high and slot numbers=0, 3, 6, and 9 are removed based on the rate tag 1040, then (3) the candidate identifier 'abc123' would not be removed. However, using the same example, if candidates with level=high and slot numbers=0, 4, 8, and 12 are removed based on the rate tag 1040, then the candidate identifier 'abc123' would be removed from the bit set 1046.

One or more servers may generate targeted communications based on (1) the candidates remaining in the bit set 1046 after removal of one or more suitable candidates, (2) for each of the removed suitable candidates, and/or (3) all, or a part of, the suitable candidates comprised in the bit set 1046.

Figure 3:
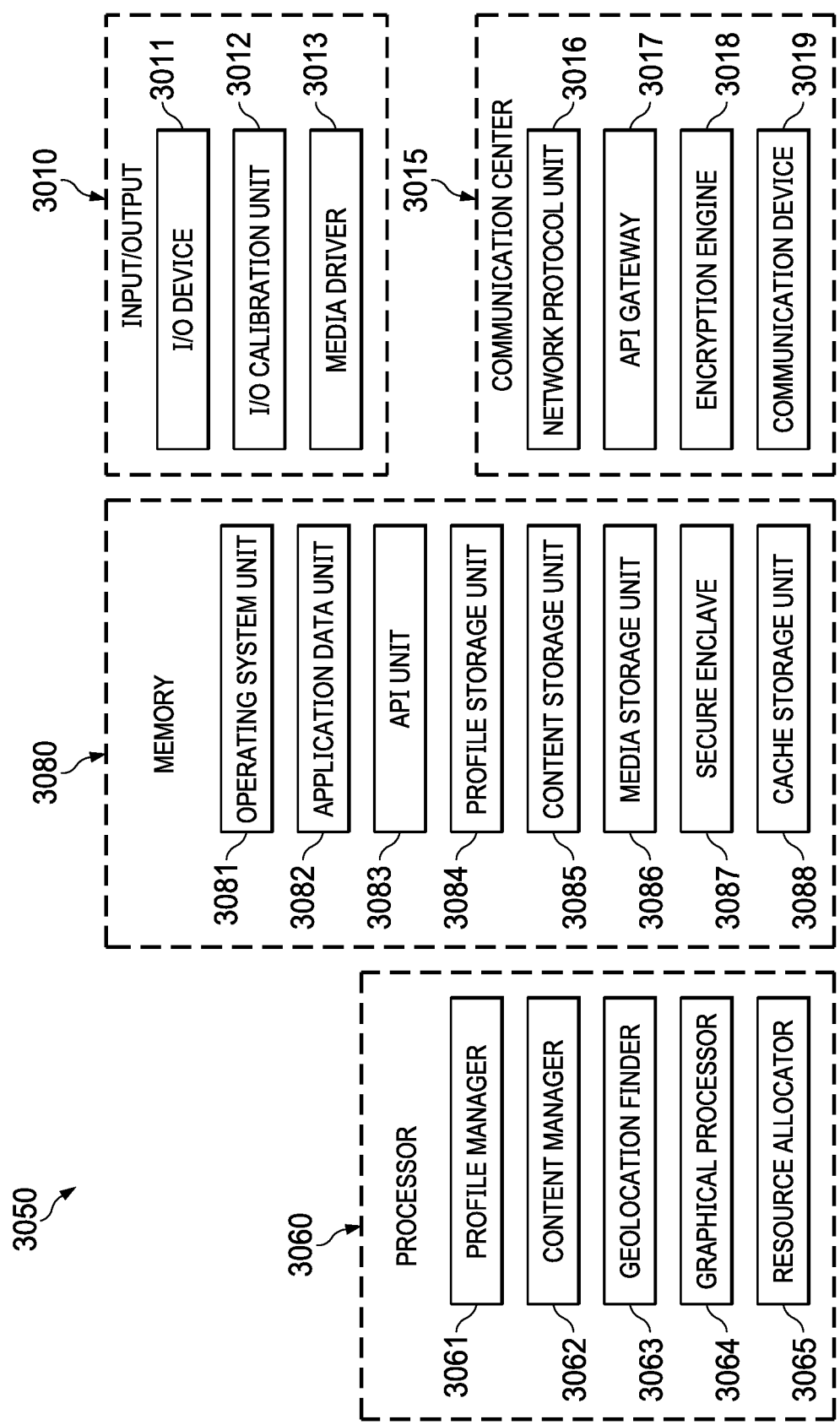
FIG. 3 shows functional block diagram of a server for generating targeted communications associated with disclosed systems and methods.

As illustrated in FIG. 3, a server 3050 may include, among other elements, any combination of a processor 3060, a memory 3080, an input/output (I/O) 3010, and a communication center 3015. As described in present embodiments, each of the processor 3060, the memory 3080, the I/O 3010, and communication center 3015 may include a plurality of respective units, subunits, and/or elements. Furthermore, each of the processor 3060, the memory 3080, the I/O 3010, and the communication center 3015 may be operatively or otherwise communicatively coupled with each other so as to facilitate the methods and techniques described herein.

The processor 3060 may control any one or more of the memory 3080, the I/O 3010, the communication center 3015, or any other unit which may include the server 3050, as well as any included subunits, elements, components, devices, or functions performed by each or a combination of the memory 3080, the I/O 3010, the communication center 3015 or any other unit which may include the server 3050. Any of the elements or sub-elements of the server 3050 presented here may also be included in a similar fashion in any of the other units, subunits, and devices included in the system 2000 of FIG. 2. Additionally, any actions described herein as being performed by a processor 3060 may be taken by the processor 3060 alone, or by the processor 3060 in conjunction with one or more additional processors, units, subunits, elements, components, devices, and the like. Additionally, while only one processor 3060 may be shown in the figures included here, multiple processors may be present or otherwise included in the server 3050 or elsewhere in the system of FIG. 2. Thus, while instructions may be described as being executed by the processor 3060 or the various subunits of the processor 3061, 3062, 3063, 3064, 3065, the instructions may be executed simultaneously, serially, or otherwise by one or more multiple processors 3060.

In some embodiments, a processor 3060 may be implemented as one or more computer processor (CPU) chips, graphical processor (GPU) chips, or some combination of CPU chips and GPU chips, and may include a hardware device capable of executing computer instructions. The processor 3060 may execute any combination of instructions, codes, computer programs, and scripts. The instructions, codes, computer programs, and scripts may be received from, stored in, or received from and stored in any combination of the memory 3080, the I/O 3010, the communication center 3015, subunits of the previously described elements, other devices, other computing environments. In some embodiments, non-transitory computer-readable medium comprising code may be provided to perform one or more of the various processes, methods, functions, etc. described herein.

In some embodiments, the processor 3060 may include, among other elements, subunits. Subunits may include any combination of a profile manager 3061, a content manager 3062, a geolocation finder 3063, a graphical processor 3064, and a resource allocator 3065. Each of these subunits of the processor 3060 may be communicatively or otherwise operably coupled with each other.

The profile manager 3061 may facilitate any combination of generation, modification, analysis, transmission, and presentation of a user profile associated with a user, e.g. first user, second user, etc. For example, the profile manager 3061 may prompt a user, through a first user device or a second user device, to register by inputting authentication credentials, personal identifying information, contact information, preferred buying habits, location, or any other information which may be associated with generating a personal profile for the user. The profile manager 3061 may also control or utilize an element of the I/O 3010 to enable a user to take a picture or video of themselves or another person. The profile manager 3061 may receive, process, analyze, organize, transform, or any combination of these, any received from the user or another computing element as to generate a user profile of a user that may include any combination of personal information, contact information, user preferences, photos, videos, audio clips, a history of user activity, user preferences, user search history, user location, settings, and the like.

The content manager 3062 may facilitate any combination of generation, modification, analysis, transmission, and presentation of media content associated with methods and systems for network communication disintermediation. For example, the content manager 3062 may control the environment of the application during the execution of various processes. For purposes of illustration and not limitation, media content for which the content manager 3062 may be responsible may include any combination of advertisements, images, text, themes, audio files, video files, documents, and the like. In some embodiments, the content manager 3062 may also interface with any combination of a third-party content server, memory location, and/or a database.

The geolocation finder 3063, particularly in communication with geolocation information, e.g., provided by GPS subsystems of user devices, may facilitate any combination of detection, generation, modification, analysis, transmission, and presentation of location information. Location information may include any combination of global positioning system (GPS) coordinates, an internet protocol (IP) address, a media access control (MAC) address, geolocation information, an address, a port number, a zip code, a server number, a proxy name, a proxy number, device information, serial numbers, and the like. In some embodiments, the geolocation finder 3063 may include any one or a combination of various sensors, specifically-purposed hardware elements for enabling the geolocation finder 3063 to acquire, measure, and transform location information.

The graphical processor (GPU) 3064 may facilitate any combination of generation, modification, analysis, processing, transmission, and presentation of visual content. The GPU 3064 may be configured to render visual content for presentation on a user device and/or to analyze visual content for metadata associated with a user or a user device. In some embodiments, this visual content may include the display of search result and/or activatable communication channels. The GPU 3064 may include multiple GPUs and may therefore be configured to perform and/or execute multiple processes in parallel.

The resource allocator 3065 may facilitate any one or combination of the determination, monitoring, analysis, and allocation of resources throughout the server 3050, the system 2000, any component of the system 2000, or other computing environments. For example, the resource allocator 3065 may facilitate interaction between the server 3050, any subunit of the server 3050, and a high volume (e.g. multiple) of users or associated user devices. As such, computing resources of the server 3050 utilized by any one or a combination of the processor 3061, the memory 3080, the I/O 3010, the communication center 3015, and any subunit of these units, such as processing power, data storage space, network bandwidth, and the like may be in high demand at various times during operation. Accordingly, the resource allocator 3065 may be configured to manage the allocation of various computing resources as they are required by particular units or particular subunits of the server 3050.

In some embodiments, the resource allocator 3065 may include sensors and/or other specially-purposed hardware for monitoring performance of each unit and/or subunit of the server 3050, as well as hardware for responding to the computing resource needs of each unit or subunit. In some embodiments, the resource allocator 3065 may utilize computing resources of a second computing environment separate and distinct from the server 3050 to facilitate a desired operation.

In some embodiments, factors affecting the allocation of computing resources by the resource allocator 3065 may include the number of ongoing user device connections and/or other communication channel connections, a duration during which computing resources are required by one or more elements of the server 3050, and/or the like. In some embodiments, computing resources may be allocated to and/or distributed amongst a plurality of second computing environments included in the server 3050 based on one or more factors mentioned above. In some embodiments, the allocation of computing resources of the resource allocator 3065 may include one or more resource allocators 3065 flipping a switch, adjusting processing power, adjusting memory size, partitioning a memory element, transmitting data, controlling one or more input and/or output devices, modifying various communication protocols, and the like. In some embodiments, the resource allocator 3065 may facilitate utilization of parallel processing techniques such as dedicating a plurality of GPUs included in the processor 3060.

In some embodiments, the memory 3080 may be utilized for one or any combination of storing, recalling, receiving, transmitting, and/or accessing various files and/or information during operation of the server 3050. The memory 3080 may additionally be used for storing, recalling, and/or updating user profile information and the like. The memory 3080 may include various types of data storage media such as solid state storage media, hard disk storage media, and any other type of data storage medium which may be known to a person of ordinary skill in the art. The memory 3080 may include dedicated hardware elements such as hard drives and/or servers, as well as software elements such as cloud-based storage drives. For example, the memory 3080 may include various subunits such as an operating system unit 3081, an application data unit 3082, an application programming interface (API) unit 3083, a profile storage unit 3084, a content storage unit 3085, a video storage unit 3086, a secure enclave 3087, and/or a cache storage unit 3088.

The memory 3080 and any of its subunits described here may include any one or any combination of random access memory (RAM), read only memory (ROM), and various forms of secondary storage. RAM may be used to store volatile data and/or to store instructions that may be executed by the processor 3060. For example, the data stored may be any one or a combination of a command, a current operating state of the server 3050, an intended operating state of the server 3050, and the like. As a further example, data stored in the memory 3080 may include instructions related to various methods and/or functionalities described here. ROM may be a non-volatile memory device that may have a smaller memory capacity than the memory capacity of a secondary storage. ROM may be used to store instructions and/or data that may be read during execution of computer instructions. In some embodiments, access to both RAM and ROM may be faster than access to secondary storage. Secondary storage may include one or more disk drives and/or tape drives and may be used for non-volatile storage of data or as an over-flow data storage device if RAM is not large enough to hold all working data. Secondary storage may be used to store programs that may be loaded into RAM when such programs are selected for execution. In some embodiments, the memory 3080 may include one or more databases for storing any data described here. Additionally or alternatively, one or more secondary databases located remotely from the server 3050 may be utilized and/or accessed by the memory 3080.

The operating system unit 3081 may facilitate deployment, storage, access, execution, and/or utilization of an operating system utilized by the server 3050 and/or any other computing environment described herein. In some embodiments, the operating system may include various hardware and/or software elements that serve as a structural framework for enabling the processor 3060 to execute various operations. The operating system unit 3081 may further store various pieces of information and/or data associated with operation of the operating system and/or the server 3050 as a whole, such as a status of computing resources (e.g., processing power, memory availability, resource utilization, and/or the like), runtime information, modules to direct execution of operations described herein, user permissions, security credentials, and the like.

The application data unit 3082 may facilitate deployment, storage, access, execution, and/or utilization of an application utilized by the server 3050 or any other computing environment described herein (e.g., a user device). For example, users may be required to download, access, and/or otherwise utilize a software application on a user device such as a smartphone or other internet-enabled device in order for various operations described herein to be performed. As such, the application data unit 3082 may store any information and/or data associated with the application which may allow the application and/or user device to perform methods associated with network communication disintermediation. As such, information included in the application data unit 3082 may enable a user to execute various operations described here. The application data unit 3082 may further store various pieces of information and/or data associated with operation of the application and/or the server 3050 as a whole, such as a status of computing resources (e.g., processing power, memory availability, resource utilization, and/or the like), runtime information, modules to direct execution of operations described herein, user permissions, security credentials, and the like.

The application programming interface (API) unit 3083 may facilitate deployment, storage, access, execution, and/or utilization of information associated with APIs of the server 3050 and/or any other computing environment described herein (e.g., a user device). For example, server 3050 may include one or more APIs for enabling various devices, applications, and/or computing environments to communicate with the server 3050, multiple other servers, databases, or other user devices. Accordingly, the API unit 3083 may include API databases containing information that may be accessed and/or utilized by applications and/or operating systems of other devices and/or computing environments associated with network communication disintermediation. An API may direct communications between the background component of the user device and the server 3050. In some embodiments, each API database may be associated with a customized physical circuit included in the memory unit 3080 and/or the API unit 3083. Additionally, each API database may be public and/or private, and so authentication credentials may be required to access information in an API database.

The profile storage unit 3084 may facilitate deployment, storage, access, and/or utilization of information associated with user profiles of users by the server 3050 and any other computing environment described here (e.g., a user device). For example, the profile storage unit 3050 may store one or more of a user's contact information, authentication credentials, user preferences, user history of behavior, personal information, search histories, purchasing histories, user ratings, and metadata. The profile storage unit 3084 may store a user's images, searching histories, a user's location history as determined through the GPS subsystems of the user device, etc. In some embodiments, the profile storage unit 3084 may communicate with the profile management unit 3061 to receive and/or transmit information associated with a user's profile.

The content storage unit 3085 may facilitate deployment, storage, access, and/or utilization of information associated with requested content by the server 3050 and/or any other computing environment described here (e.g., a user device such as a mobile device). For example, the content storage unit 3085 may store one or more of images, text, videos, audio content, advertisements, product lists, user recommendations, and metadata to be presented to a user during operations described herein. In some embodiments, the content storage unit 3085 may communicate with the content management unit 3062 to receive and/or transmit content files.

The media storage unit 3086 may facilitate one or more of deployment, storage, access, analysis, and utilization of media content by the server 3050 and any other computing environment described herein (e.g., a user device). Media content may be images, videos, audio files, and any other form of communicative media. For example, the media storage unit 3086 may store one or more chat histories between a user and other users on the system 2000. Further, the media storage unit 3086 may store one or more searches, results, alerts, etc., generated by any unit or subunit of a server 3050 or user device. Media content generated or used in performing any of the methods disclosed here may be stored in the media storage unit 3086 so that the media content may be analyzed by various components of the server 3050 both in real time and at a time after receipt of the media content. In some embodiments, the media storage unit 3086 may communicate with the GPUs 3064 to facilitate any of the processes described here. In some embodiments, media content may include audio, images, text, video feeds, and/or any other media content associated with methods and systems for network communication disintermediation.

The secure enclave 3087 may facilitate secure storage of data. In some embodiments, the secure enclave 3087 may include a partitioned portion of storage media included in the memory unit 3080 that is protected by various security measures. For example, the secure enclave 3087 may be hardware secured. In other embodiments, the secure enclave 3087 may include one or more firewalls, encryption mechanisms, and/or other security-based protocols. Authentication credentials of a user may be required prior to providing the user access to data stored within the secure enclave 3087. In some embodiments, the secure enclave 3087 may store sensitive user information such as credit card data, sensitive personal data, and/or data associated with the location of a person throughout time.

The cache storage unit 3088 may facilitate short-term deployment, storage, access, analysis, and/or utilization of data. In some embodiments, the cache storage unit 3088 may serve as a short-term storage location for data so that the data stored in the cache storage unit 3088 may be accessed quickly. In some embodiments, the cache storage unit 3088 may include RAM and/or other storage media types that enable quick recall of stored data. The cache storage unit 3088 may include a partitioned portion of storage media included in the memory 3080.

The I/O unit 3010 may include hardware and/or software elements for enabling the server 3050 to receive, transmit, and/or present information. For example, elements of the I/O unit 3050 may be used to receive user input from a user via a user device, present results, alerts, or compilation responses to the user via the user device, present suggested matches to the user via a user device, and the like. In this manner, the I/O unit 3010 may enable the server 3050 to interface with a human user in a manner such that the user may use the methods described here. As described, the I/O unit 3010 may include subunits such as one of, or a combination of, an I/O device 3011, an I/O calibration unit 3012, and/or media driver 3013.

The I/O device 3010 may facilitate any one or any combination of the receipt, transmission, processing, presentation, display, input, and output of information as a result of executed processes described here. In some embodiments, the I/O device 3010 may include a plurality of I/O devices. In some embodiments, the I/O device 3010 may include one or more elements of any one or a combination of a user device, a computing system, a server 3050, and a similar device.

The I/O device 3011 may include a variety of elements that enable a user to interface with the server 3050. For example, the I/O device 3011 may include a keyboard, a touchscreen, a button, a sensor, a biometric scanner, a laser, a microphone, a camera, an internet-enabled device, and/or another element for receiving and/or collecting input from a user. Additionally and/or alternatively, the I/O device 3011 may include a display, a screen, a sensor, a vibration mechanism, a light emitting diode (LED), a speaker, a radio frequency identification (RFID) scanner, and/or another element for presenting and/or otherwise outputting data to a user. In some embodiments, the I/O device 3011 may communicate with one or more elements of the processor 3060 and/or the memory unit 3080 to execute operations described herein. For example, the I/O device 3011 may include a display, which may utilize the GPU 3064 to present media content stored in the media storage unit 3086 to a user of a user device.

The I/O calibration unit 3012 may facilitate the calibration of the I/O device 3011. For example, the I/O calibration unit 3012 may detect and/or determine one or more settings of the I/O device 3011, and then adjust and/or modify settings so that the I/O device 3011 may operate more efficiently. In some embodiments, the I/O calibration unit 3012 may utilize a media driver 3013 (or multiple media drivers) to calibrate the I/O device 3011. The media driver 3013 may be installed on a user device so that the user device may recognize and/or integrate with the I/O device 30114, thereby enabling media content to be displayed, received, generated, and the like. In some embodiments, the I/O device 3011 may be calibrated by the I/O calibration unit 3012 by based on information included in the media driver 3013.

The communication center 3015 may facilitate establishment, maintenance, monitoring, and/or termination of communications between the server 3050 and other devices such as user devices, other computing environments, third party server systems, and the like. The communication center 3015 may further enable communication between various elements (e.g., units and/or subunits) of the server 3050 as needed. In some embodiments, the communication center 3015 may include a network protocol unit 3016, an API gateway 3017, an encryption engine 3018, and/or a communication device 3019. The communication center 3015 may include hardware and/or software elements.

The network protocol unit 3016 may facilitate establishment, maintenance, and/or termination of a communication connection between the server 3050 and another device (e.g. user device) by way of a network. For example, the network protocol unit 3016 may detect and/or define a communication protocol required by a particular network and/or network type. Communication protocols utilized by the network protocol unit 348 may include Wi-Fi protocols, Li-Fi protocols, cellular data network protocols, Bluetooth® protocols, WiMAX protocols, Ethernet protocols, power line communication (PLC) protocols, and the like. In some embodiments, facilitation of communication between the server 3050 and any other device, as well as any element internal to the server 3050, may include transforming and/or translating data from being compatible with a first communication protocol to being compatible with a second communication protocol. In some embodiments, the network protocol unit 3016 may determine and/or monitor an amount of data traffic to consequently determine which particular network protocol is to be used for establishing a connection with a user device, transmitting data, and/or performing other operations described herein.

The API gateway 3017 may facilitate the enablement of other devices and/or computing environments to access the API unit 3083 of the memory 3080 of the server 3050. For example, a user device may access the API unit 3083 via the API gateway 3017. In some embodiments, the API gateway 3017 may be required to validate user credentials associated with a user of a user device prior to providing access to the API unit 3083 to the user. The API gateway 3017 may include instructions for enabling the server 3050 to communicate with another device.

The encryption engine 3018 may facilitate any one or any combination of translation, encryption, encoding, decryption, and decoding of information received, transmitted, and/or stored by the server 3050. For example, the encryption engine 3018 may encrypt data associated with a user's credit card information, etc. Using the encryption engine, each transmission of data may be encrypted, encoded, and/or translated for security reasons, and any received data may be encrypted, encoded, and/or translated prior to its processing and/or storage. In some embodiments, the encryption engine 3018 may generate any one or combination of an encryption key, an encoding key, a translation key, and the like, which may be transmitted along with any data content.

The communication device 3019 may include a variety of hardware and/or software specifically purposed to enable communication between the server 3050 and another device (e.g. user device), as well as communication between elements of the server 3050. In some embodiments, the communication device 3019 may include one or more radio transceivers, chips, analog front end (AFE) units, antennas, processors, memory, other logic, and/or other components to implement communication protocols (wired or wireless) and related functionality for facilitating communication between the server 3050 and any other device. Additionally and/or alternatively, the communication device 3019 may include a modem, a modem bank, an Ethernet device such as a router or switch, a universal serial bus (USB) interface device, a serial interface, a token ring device, a fiber distributed data interface (FDDI) device, a wireless local area network (WLAN) device and/or device component, a radio transceiver device such as code division multiple access (CDMA) device, a global system for mobile communications (GSM) radio transceiver device, a universal mobile telecommunications system (UMTS) radio transceiver device, a long term evolution (LTE) radio transceiver device, a worldwide interoperability for microwave access (WiMAX) device, and/or another device used for communication purposes.

Any transmission, reception, connection, or communication may occur using any short-range (e.g., Bluetooth, Bluetooth Low Energy, near field communication, Wi-Fi Direct, etc.) or long-range communication mechanism (e.g., Wi-Fi, cellular, etc.). Additionally or alternatively, any transmission, reception, connection, or communication may occur using wired technologies. Any transmission, reception, or communication may occur directly between systems or indirectly via one or more systems such as servers.

The present disclosure provides several important technical advantages that will be readily apparent to one skilled in the art from the figures, descriptions, and claims. Moreover, while specific advantages have been enumerated above, various embodiments may include all, some, or none of the enumerated advantages. Any sentence or statement in this disclosure may be associated with one or more embodiments.

While various embodiments in accordance with the disclosed principles have been described above, it should be understood that they have been presented by way of example only, and are not limiting. Furthermore, any reference in this disclosure to "invention" in the singular should not be used to argue that there is only a single point of novelty in this disclosure. Multiple inventions may be set forth herein.

What is claimed is:

1. A method for generating and querying an index associated with targeted communications, comprising:
   determining or receiving, using one or more computing device processors, a first candidate identifier, a first rate of targeted communication transmission, and at least one trait associated with a targeted communication recipient, associated with a first candidate targeted communication;
   determining or receiving, using the one or more computing device processors, a second candidate identifier, a second rate of targeted communication transmission, and at least one trait associated with a targeted communication recipient, associated with a second candidate targeted communication;
   determining or receiving, using the one or more computing device processors, a third candidate identifier, a third rate of targeted communication transmission, and at least one trait associated with a targeted communication recipient, associated with a third candidate targeted communication;
   generating or accessing, using the one or more computing device processors, a candidate index comprising:
      a first dimension, comprising a first dimension trait associated with the first candidate targeted communication, a first dimension trait associated with the second candidate targeted communication, and a first dimension trait associated with the third candidate targeted communication; and
      a second dimension comprising a second dimension trait associated with the first candidate targeted communication and a second dimension trait associated with the third candidate targeted communication, wherein the second candidate targeted communication does not comprise a second dimension trait associated with the second candidate targeted communication;

receiving, using the one or more computing device processors, a query from a computing device, wherein the query is associated with a first desired candidate trait, associated with the first dimension, and a second desired candidate trait, associated with the second dimension;

determining or generating, using the one or more computing device processors, an ordered first set comprising a first indicator indicating whether the first candidate targeted communication comprises the first desired candidate trait, a second indicator indicating whether the second candidate targeted communication comprises the first desired candidate trait, and a third indicator indicating whether the third candidate targeted communication comprises the first desired candidate trait, wherein a position of the first indicator in the ordered first set corresponds to a position of the first candidate targeted communication in the candidate index, wherein a position of the second indicator in the ordered first set corresponds to a position of the second candidate targeted communication in the candidate index, and wherein a position of the third indicator in the ordered first set corresponds to a position of the third candidate targeted communication in the candidate index;

determining or generating, using the one or more computing device processors, an ordered second set comprising a fourth indicator indicating whether the first candidate targeted communication comprises the second desired candidate trait, a fifth indicator indicating whether the second candidate targeted communication comprises the second desired candidate trait, and a sixth indicator indicating whether the third candidate targeted communication comprises the second desired candidate trait;

determining or generating, a using the one or more computing device processors, based on performing an intersecting computation based on the ordered first set and the ordered second set, a result set comprising a seventh indicator associated with the first candidate targeted communication and an eighth indicator associated with the third candidate targeted communication;

eliminating, using the one or more computing device processors, the first candidate targeted communication from the result set based on the first rate of targeted communication transmission; and selecting, using the one or more computing device processors, the third candidate targeted communication from the result set based on the third rate of targeted communication transmission.

2. The method of claim 1, wherein a position of the fourth indicator in the ordered second set corresponds to the position of the first candidate targeted communication in the candidate index, wherein a position of the fifth indicator in the ordered second set corresponds to the position of the second candidate targeted communication in the candidate index, and wherein a position of the sixth indicator in the ordered second set corresponds to the position of the third candidate targeted communication in the candidate index.

3. The method of claim 1, further comprising transmitting, using the one or more computing device processors, the third candidate targeted communication to a user device for display on the user device.

4. The method of claim 1, wherein in response to determining the second candidate targeted communication does not comprise the second dimension trait, the second candidate targeted communication is included in an always-matching set for the second dimension such that one or more candidate targeted communications from the always-matching set are always included in the ordered second set.

5. The method of claim 1, wherein in response to determining the second candidate targeted communication does not comprise the second dimension trait, the fifth indicator indicates the second candidate targeted communication comprises all second dimension traits.

6. The method of claim 1, wherein the ordered first set comprises non-binary indicators.

7. The method of claim 1, wherein the candidate index comprises a candidate array.

8. The method of claim 7, wherein the ordered first set comprises binary indicators.

9. The method of claim 1, wherein the ordered first set, the ordered second set, or the result set does not comprise an always-matching candidate targeted communication that comprises or is associated with the first desired candidate trait and the second desired candidate trait.

10. The method of claim 9, wherein the always-matching candidate targeted communication, or a ninth indicator indicating the always-matching candidate targeted communication comprises or is associated with the first desired candidate trait and the second desired candidate trait, is comprised in an always-matching set.

11. The method of claim 9, wherein no or null data is present in a position in the ordered first set, the ordered second set, or the result set corresponding to the always-matching candidate targeted communication.

12. The method of claim 1, wherein the ordered first set, the ordered second set, or the result set comprises a ninth indicator indicating an always-matching candidate targeted communication comprises or is associated with the first desired candidate trait and the second desired candidate trait.

13. A method for generating and querying an index associated with targeted communications, comprising:

determining or receiving, using one or more computing device processors, a first candidate identifier and at least one trait associated with a targeted communication recipient, associated with a first candidate targeted communication;

determining or receiving, using the one or more computing device processors, a second candidate identifier and at least one trait associated with a targeted communication recipient, associated with a second candidate targeted communication;

determining or receiving, using the one or more computing device processors, a third candidate identifier and at least one trait associated with a targeted communication recipient, associated with a third candidate targeted communication;

generating or accessing, using the one or more computing device processors, a candidate index comprising:

a first dimension, comprising a first dimension trait associated with the first candidate targeted communication, a first dimension trait associated with the second candidate targeted communication, and a first dimension trait associated with the third candidate targeted communication; and a second dimension comprising a second dimension trait associated with the first candidate targeted communication and a second dimension trait associated with the third candidate targeted communication, wherein the second candidate targeted communication does not comprise a second dimension trait associated with the second candidate targeted communication;

receiving, using the one or more computing device processors, a query from a computing device, wherein the query is associated with a first desired candidate trait, associated with the first dimension, and a second desired candidate trait, associated with the second dimension;

determining or generating, using the one or more computing device processors, an ordered first set comprising a first indicator indicating whether the first candidate targeted communication comprises the first desired candidate trait, a second indicator indicating whether the second candidate targeted communication comprises the first desired candidate trait, and a third indicator indicating whether the third candidate targeted communication comprises the first desired candidate trait, wherein a position of the first indicator in the ordered first set corresponds to a position of the first candidate targeted communication in the candidate index, wherein a position of the second indicator in the ordered first set corresponds to a position of the second candidate targeted communication in the candidate index, and wherein a position of the third indicator in the ordered first set corresponds to a position of the third candidate targeted communication in the candidate index;

determining or generating, using the one or more computing device processors, an ordered second set comprising a fourth indicator indicating whether the first candidate targeted communication comprises the second desired candidate trait, a fifth indicator indicating whether the second candidate targeted communication comprises the second desired candidate trait, and a sixth indicator indicating whether the third candidate targeted communication comprises the second desired candidate trait;

determining or generating, using the one or more computing device processors, based on performing a computation based on the ordered first set and the ordered second set, a result set comprising a seventh indicator associated with the first candidate targeted communication and an eighth indicator associated with the third candidate targeted communication; and selecting, using the one or more computing device processors, the third candidate targeted communication from the result set based on a rate of targeted communication transmission.

14. The method of claim 13, wherein a position of the fourth indicator in the ordered second set corresponds to the position of the first candidate targeted communication in the candidate index, wherein a position of the fifth indicator in the ordered second set corresponds to the position of the second candidate targeted communication in the candidate index, and wherein a position of the sixth indicator in the ordered second set corresponds to the position of the third candidate targeted communication in the candidate index.

15. The method of claim 13, further comprising transmitting, using the one or more computing device processors, the third candidate targeted communication to a user device for display on the user device.

16. The method of claim 13, wherein in response to determining the second candidate targeted communication does not comprise the second dimension trait, the second candidate targeted communication is included in an always-matching set for the second dimension such that one or more candidate targeted communications from the always-matching set are always included in the ordered second set.

17. The method of claim 13, wherein in response to determining the second candidate targeted communication does not comprise the second dimension trait, the fifth indicator indicates the second candidate targeted communication comprises multiple second dimension traits.

18. The method of claim 13, wherein the first dimension further comprises the first candidate identifier.

19. The method of claim 13, wherein the ordered first set is associated with the first dimension and comprises non-binary indicators.

20. The method of claim 13, wherein the ordered first set is associated with the first dimension and comprises binary indicators.

21. The method of claim 13, further comprising determining or receiving, using the one or more computing device processors, a first rate of targeted communication transmission associated with the first candidate identifier.

22. The method of claim 21, further comprising generating, using the one or more computing device processors, a first rate tag based on the first rate of targeted communication transmission associated with the first candidate identifier.

23. The method of claim 22, further comprising eliminating, using the one or more computing device processors, the first candidate targeted communication from the result set based on the first rate tag.

24. A system for generating and querying an index associated with targeted communications, the system comprising:

a memory comprising instructions; and a processing device configured for executing the instructions, wherein the instructions cause the processing device to perform operations of:

determining or receiving a first candidate identifier, a first rate of targeted communication transmission, and at least one trait associated with a targeted communication recipient, associated with a first candidate targeted communication;

determining or receiving a second candidate identifier, a second rate of targeted communication transmission, and at least one trait associated with a targeted communication recipient, associated with a second candidate targeted communication;

determining or receiving a third candidate identifier, a third rate of targeted communication transmission, and at least one trait associated with a targeted communication recipient, associated with a third candidate targeted communication;

generating or accessing a candidate index comprising:

a first dimension, comprising a first dimension trait associated with the first candidate targeted communication, a first dimension trait associated with the second candidate targeted communication, and a first dimension trait associated with the third candidate targeted communication; and a second dimension comprising a second dimension trait associated with the first candidate targeted communication and a second dimension trait associated with the third candidate targeted communication, wherein the second candidate targeted communication does not comprise a second dimension trait associated with the second candidate targeted communication;

receiving a query from a computing device, wherein the query is associated with a first desired candidate trait, associated with the first dimension, and a second desired candidate trait, associated with the second dimension;

determining or generating an ordered first set comprising a first indicator indicating whether the first candidate targeted communication comprises the first desired candidate trait, a second indicator indicating whether the second candidate targeted communication comprises the first desired candidate trait, and a third indicator indicating whether the third candidate targeted communication comprises the first desired candidate trait, wherein a position of the first indicator in the ordered first set corresponds to a position of the first candidate targeted communication in the candidate index, wherein a position of the second indicator in the ordered first set corresponds to a position of the second candidate targeted communication in the candidate index, and wherein a position of the third indicator in the ordered first set corresponds to a position of the third candidate targeted communication in the candidate index;

determining or generating an ordered second set comprising a fourth indicator indicating whether the first candidate targeted communication comprises the second desired candidate trait, a fifth indicator indicating whether the second candidate targeted communication comprises the second desired candidate trait, and a sixth indicator indicating whether the third candidate targeted communication comprises the second desired candidate trait;

determining or generating, based on performing an intersecting computation based on the ordered first set and the ordered second set, a result set comprising a seventh indicator associated with the first candidate targeted communication and an eighth indicator associated with the third candidate targeted communication;

eliminating the first candidate targeted communication from the result set based on the first rate of targeted communication transmission; and selecting the third candidate targeted communication from the result set based on the third rate of targeted communication transmission.

25. A method for generating and querying an index associated with targeted communications, the method comprising:

determining or receiving, using one or more computing device processors, a first candidate identifier, a first rate of targeted communication transmission, and at least one trait associated with a targeted communication recipient, associated with a first candidate targeted communication;

determining or receiving, using the one or more computing device processors, a second candidate identifier, a second rate of targeted communication transmission, and at least one trait associated with a targeted communication recipient, associated with a second candidate targeted communication;

determining or receiving, using the one or more computing device processors, a third candidate identifier, a third rate of targeted communication transmission, and at least one trait associated with a targeted communication recipient, associated with a third candidate targeted communication;

accessing, using the one or more computing device processors, a candidate index comprising:
  a first dimension, comprising a first dimension trait associated with the first candidate targeted communication, and a first dimension trait associated with the second candidate targeted communication, wherein the third candidate targeted communication does not comprise a first dimension trait associated with the third candidate targeted communication; and
  a second dimension, comprising a second dimension trait associated with the first candidate targeted communication, and a second dimension trait associated with the third candidate targeted communication, wherein the second candidate targeted communication does not comprise a second dimension trait associated with the second candidate targeted communication;

receiving, using the one or more computing device processors, a query from a computing device, wherein the query is associated with a first desired candidate trait, associated with the first dimension, and a second desired candidate trait, associated with the second dimension;

determining or generating, using the one or more computing device processors, a first set comprising the first candidate targeted communication, in response to determining the first candidate targeted communication comprises or is associated with the first desired candidate trait, the second candidate targeted communication, in response to determining the second candidate targeted communication comprises or is associated with the first desired candidate trait, wherein the third candidate targeted communication is not included in the first set, in response to determining the third candidate targeted communication does not comprise or is not associated with the first desired candidate trait;

determining or generating, using the one or more computing device processors, a second set comprising the first candidate targeted communication, in response to determining the first candidate targeted communication comprises or is associated with the second desired candidate trait, and the third candidate targeted communication, in response to determining the third candidate targeted communication comprises or is associated with the second desired candidate trait, wherein the second candidate targeted communication is not included in the second set, in response to determining the second candidate targeted communication does not comprise or is not associated with the second desired candidate trait;

determining, using the one or more computing device processors, the first candidate targeted communication is a common candidate targeted communication between the first set and the second set; and determining, using the one or more computing device processors, whether to send the first candidate targeted communication to a user device based on the first rate of targeted communication transmission.

26. The method of claim 25, wherein the first set is ordered.

27. The method of claim 26, wherein a position of a first indicator in the first set corresponds to a position of the first candidate targeted communication in the candidate index, and wherein a position of a second indicator in the first set corresponds to a position of the second candidate targeted communication in the candidate index.

28. The method of claim 25, wherein the first set, the second set, or a result set produced from performing an intersecting computation based on the first set and the second set, does not comprise an always-matching candidate targeted communication that comprises or is associated with the first desired candidate trait and the second desired candidate trait.

29. The method of claim 28, wherein the always-matching candidate targeted communication is comprised in an always-matching set.

30. The method of claim 25, wherein the first set, the second set, or a result set produced from performing an intersecting computation based on the first set and the second set, comprises an always-matching candidate targeted communication that comprises or is associated with the first desired candidate trait and the second desired candidate trait.

\* \* \* \* \*